United States Patent
Kendall (10) Patent No.: US 7,350,614 B1
(45) Date of Patent: Apr. 1, 2008

(54) SYSTEM AND METHOD FOR VEHICLE CAB WITH LANDMINE PROTECTION

(75) Inventor: Donald H. Kendall, Chassell, MI (US)

(73) Assignee: United States of America as represented by the Secretary of the Army, Washington, DC (US)

( * ) Notice: Subject to any disclaimer, the term of this patent is extended or adjusted under 35 U.S.C. 154(b) by 379 days.

(21) Appl. No.: 11/217,842

(22) Filed: Aug. 25, 2005

(51) Int. Cl.
*B60R 21/00* (2006.01)

(52) U.S. Cl. ............... 180/271; 180/89.13; 296/190.03

(58) Field of Classification Search ............... 180/271, 180/274, 232, 282, 89.12–89.14; 296/190.03, 296/190.04, 190.05, 190.08, 35.2
See application file for complete search history.

(56) References Cited

U.S. PATENT DOCUMENTS

| | | | |
|---|---|---|---|
| 2,787,315 A | 4/1957 | Siebert | |
| 3,013,837 A | 12/1961 | Pessl et al. | |
| 3,162,479 A | 12/1964 | Hewitt | |
| 3,423,124 A | 1/1969 | Hewitt | |
| 3,508,783 A | 4/1970 | Schlanger | |
| 3,837,422 A | 9/1974 | Schlanger | |
| 3,897,101 A | 7/1975 | Hess | |
| 3,922,030 A | 11/1975 | Stedman | |
| 3,927,730 A | 12/1975 | Winslow | |
| 4,143,841 A | 3/1979 | Roeder | |
| 4,204,659 A | 5/1980 | Phillips et al. | |
| 4,279,321 A | 7/1981 | Stone | |
| 4,413,696 A | 11/1983 | Slocombe et al. | |
| 4,699,336 A | 10/1987 | Diamond | |
| 4,720,139 A | 1/1988 | McSmith | |
| 4,807,713 A | 2/1989 | Smith et al. | |
| 4,900,084 A | 2/1990 | Forster et al. | |
| 5,076,529 A | 12/1991 | Dove et al. | |
| 5,201,679 A | 4/1993 | Velte, Jr. et al. | |
| 5,251,911 A | 10/1993 | Blake | |
| 5,290,089 A | 3/1994 | Oleszko et al. | |
| 5,356,097 A | 10/1994 | Chalupa | |
| 5,454,622 A | 10/1995 | Demopoulos | |
| 5,632,518 A | 5/1997 | Kendall | |
| 5,662,376 A | 9/1997 | Breuer et al. | |

(Continued)

*Primary Examiner*—Paul N. Dickson
*Assistant Examiner*—Drew J. Brown
(74) *Attorney, Agent, or Firm*—David L. Kuhn; Thomas W. Saur; Luis Miguel Acosta (57) ABSTRACT

A system for providing a vehicle with landmine protection for occupants of a vehicle cab via controlled articulation of the vehicle cab in response to an under-vehicle explosive event includes a cab guide pin attached to the rear of the vehicle cab, and a vehicle frame having a sub-frame. The vehicle cab is mounted on the vehicle frame. The sub-frame includes a sub-assembly slot and the cab guide pin is disposed laterally at a first end in the sub-assembly slot. The sub-assembly slot has a substantially straight first section that is longitudinally positioned and having the first end of the sub-assembly slot, and a second arcuate section that extends vertically and forward from the first section opposite of the first end of the sub-assembly slot. When the vehicle is exposed to an under-vehicle explosive event, the vehicle cab articulates such that the cab guide pin travels forward through the first substantially straight section of the sub-assembly slot and in an arcuate path through the second arcuate section of the sub-assembly slot.

20 Claims, 8 Drawing Sheets

U.S. PATENT DOCUMENTS

| | | |
|---|---|---|
| 5,676,421 A | 10/1997 | Brodsky |
| 5,692,410 A | 12/1997 | Fenelon |
| 5,722,722 A | 3/1998 | Massara |
| 5,758,859 A | 6/1998 | Gonzalez |
| 5,769,257 A | 6/1998 | Fleisher et al. |
| 5,836,647 A | 11/1998 | Turman |
| 5,921,504 A | 7/1999 | Elizondo |
| 6,074,004 A | 6/2000 | Carmichael |
| 6,088,897 A | 7/2000 | Banks et al. |
| 6,190,091 B1 | 2/2001 | Byle |
| 6,267,440 B1 | 7/2001 | Hoffman |
| 6,341,639 B1 | 1/2002 | Mullet et al. |
| 6,364,043 B1 | 4/2002 | Lam |
| 6,382,563 B1 | 5/2002 | Chiu |
| 6,416,127 B1 | 7/2002 | Galbreath, Jr. et al. |
| 6,435,071 B1 | 8/2002 | Campbell |
| 6,439,651 B1 | 8/2002 | Johansson et al. |
| 6,581,992 B1 | 6/2003 | Gertz |
| 6,604,347 B2 | 8/2003 | Preipke et al. |

CONVENTIONAL

Fig. 2

CONVENTIONAL

Fig. 3

CONVENTIONAL

SYSTEM AND METHOD FOR VEHICLE CAB WITH LANDMINE PROTECTION

GOVERNMENT INTEREST

The invention described here may be made, used and licensed by and for the U.S. Government for governmental purposes without paying royalty to me.

BACKGROUND OF THE INVENTION

1. Field of the Invention

The present invention generally relates to system and a method for a vehicle cab with landmine protection for occupants of the cab.

2. Background Art

Military and civilian organizations typically attempt to clear landmines from occupied areas where the landmines have been planted. However, the attempts to remove or safely detonate hidden explosives are not always completely successful. Also, there are times when vehicles travel in areas that have been mined unbeknown to the operators of the vehicles. Furthermore, vehicles that are operated in contested regions are sometimes attacked with grenades, landmines, improvised explosive devices (IEDs), makeshift bombs, and the like that can buried or disguised. Such explosives devices can be set up anywhere and can be exploded at any time as the vehicle passes over the explosive device.

Armor is often mounted to the underbody of the vehicles. However, the armor typically provides protection against projectiles and not the shock and vibration effects (e.g., the impulse, acceleration, jerk, and the like) of the explosive blast on the vehicle cab occupants. As such, vehicles occasionally encounter and detonate explosive devices that damage or destroy the vehicle, and injure or kill occupants of the cab (i.e., cabin, passenger compartment, vehicle interior, etc.) of the vehicle. In particular, spinal related injuries are often generated by the shock and vibration effects of the explosive blast on the vehicle cab occupants seated within the vehicle.

Figure 1:
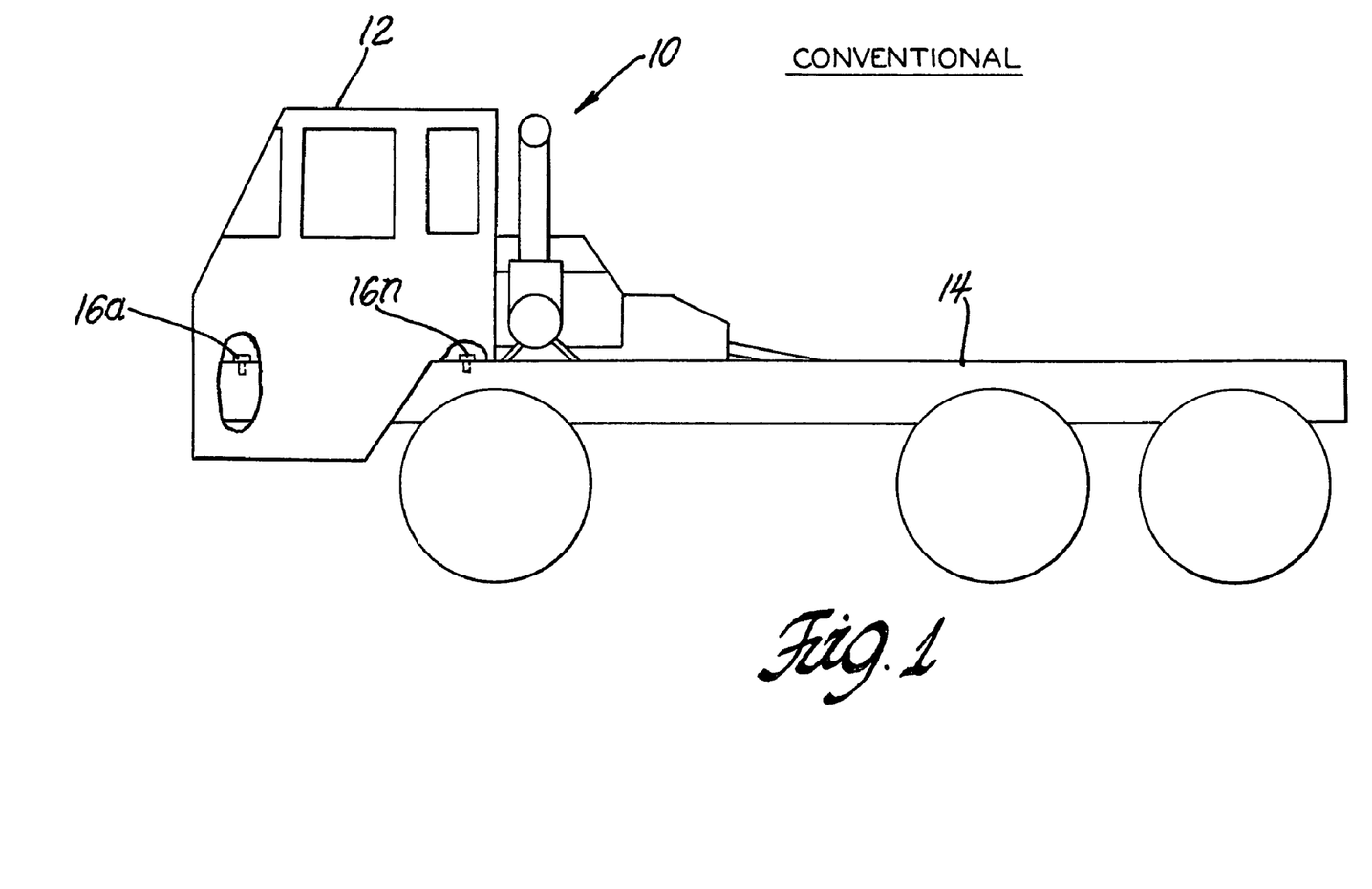
FIG. 1 is a diagram of a side view of a conventional vehicle cab mounting system.

Referring to FIG. 1, a side view illustrating an example of a conventional vehicle and cab mounting system 10 is shown. The vehicle and cab mounting system 10 generally includes a cab 12 mounted to a frame 14 via a plurality of mounts 16 (e.g., mounts 16a-16n). The vehicle and cab mounting system 10 generally has underbody armor (not shown).

Figure 2:
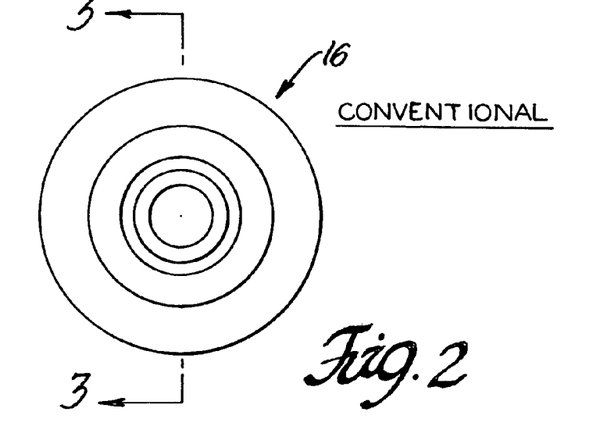
FIG. 2 is a diagram illustrating a top view of a conventional cab-to-frame mount.
Figure 3:
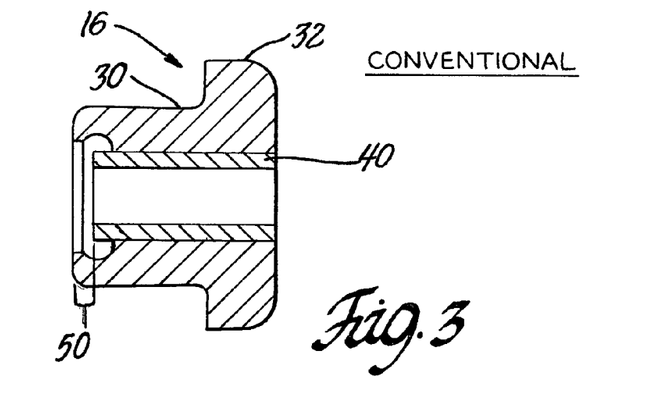
FIG. 3 is a diagram illustrating a cross-sectional view of the conventional cab-to-frame mount of FIG. 2.

Referring to FIGS. 2 and 3, top and cross-sectional views, respectively, of a conventional cab-to-body mount 16 are shown prior to installation in the system 10. FIG. 3 is a cross-sectional view taken at line 3-3 of FIG. 2. The mount 16 generally includes an outer elastomer or rubber isolator portion 30 having a shoulder region 32, and a rigid (typically steel) insert 40. The insert 40 is typically a cylindrical tube or pipe that is sized to receive a mounting bolt or stud (described in connection with FIG. 4). The isolator 30 has a compression region 50 that is sized such that the insert 40 is shorter than the thickness of the isolator portion 30 where the insert 40 is positioned. The insert 40 is positioned flush with the outer edge of the shoulder region 32 and the compression region 50 extends past the insert 40 prior to the mount 16 being installed.

Figure 4:
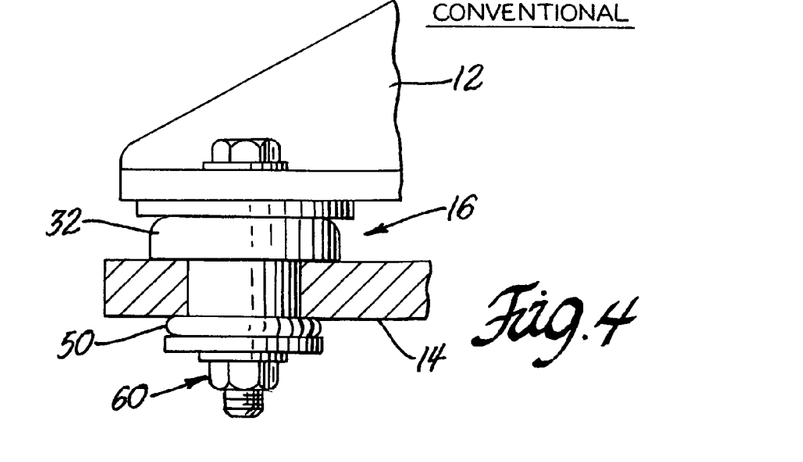
FIG. 4 is a diagram of the conventional mount of FIGS. 2 and 3 as installed in connection with a cab and frame.

Referring to FIG. 4, a diagram illustrating an installation of the mount 16 in connection with the cab 12 and the frame 14 is shown. The mount 16 is installed between the cab 12 and the frame 14. A bolt/nut combination 60 is installed in the insert 40 to fasten the cab 12, the mount 16 and the frame 14 together. The bolt/nut combination 60 is tightened and the isolator portion 30 is compressed such that the compression region 50 bulges and is generally flush with the insert 40. The conventional mount 16, therefore, provides a limited amount of shock and vibration isolation to occupants of the vehicle.

Conventional attempts to ameliorate, mitigate, reduce or eliminate shock and vibration to the vehicle cab 12 and thus the occupants thereof caused by the detonation of a landmine, IED, grenade, and the like have only been partially successful and sometimes injury and death of the vehicle occupants still occur.

Thus, there exists a need and an opportunity for an improved system and a method for a vehicle cab with landmine protection for occupants of the vehicle cab. Such an improved system and method may overcome one or more of the deficiencies of the conventional approaches.

SUMMARY OF THE INVENTION

Accordingly, the present invention may provide an improved system and a method for a vehicle cab with landmine protection for occupants of the vehicle cab.

According to the present invention, a system for providing a vehicle with landmine protection for occupants of a vehicle cab via controlled articulation of the vehicle cab in response to an under-vehicle explosive event is provided. The system comprises a cab guide pin attached to the rear of the vehicle cab, and a vehicle frame having a sub-frame. The vehicle cab is mounted on the vehicle frame. The sub-frame includes a sub-assembly slot and the cab guide pin is disposed laterally at a first end in the sub-assembly slot. The sub-assembly slot has a substantially straight first section that is longitudinally positioned and includes the first end of the sub-assembly slot, and a second arcuate section that extends vertically and forward from the first section opposite of the first end of the sub-assembly slot. When the vehicle is exposed to an under-vehicle explosive event, the vehicle cab articulates such that the cab guide pin travels forward through the first substantially straight section of the sub-assembly slot and in an arcuate path through the second arcuate section of the sub-assembly slot.

Also according to the present invention, a method of providing landmine protection to occupants of a vehicle via controlled articulation of a vehicle cab in response to an under-vehicle explosive event is provided. The method comprises attaching a cab guide pin to the rear of the vehicle cab, and mounting the vehicle cab on a vehicle frame, the vehicle frame having a sub-frame. The sub-frame includes a sub-assembly slot and the cab guide pin is disposed laterally at a first end in the sub-assembly slot. The sub-assembly slot has a substantially straight first section that is longitudinally positioned and includes the first end of the sub-assembly slot, and a second arcuate section that extends vertically and forward from the first section opposite of the first end of the sub-assembly slot. When the vehicle is exposed to an under-vehicle explosive event, the vehicle cab articulates such that the cab guide pin travels forward through the first substantially straight section of the sub-assembly slot and in an arcuate path through the second arcuate section of the sub-assembly slot.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides an improved system and a method for a vehicle, and in particular, a vehicle cab (i.e., cabin, passenger compartment, vehicle interior, etc.) with landmine protection for occupants of the vehicle cab. As used herein the terms landmine, blast and explosive event generally describes all under vehicle catastrophic explosive events caused by grenades, landmines, improvised explosive devices (IEDs), makeshift bombs, suicide bombs, and the like.

Figure 5:
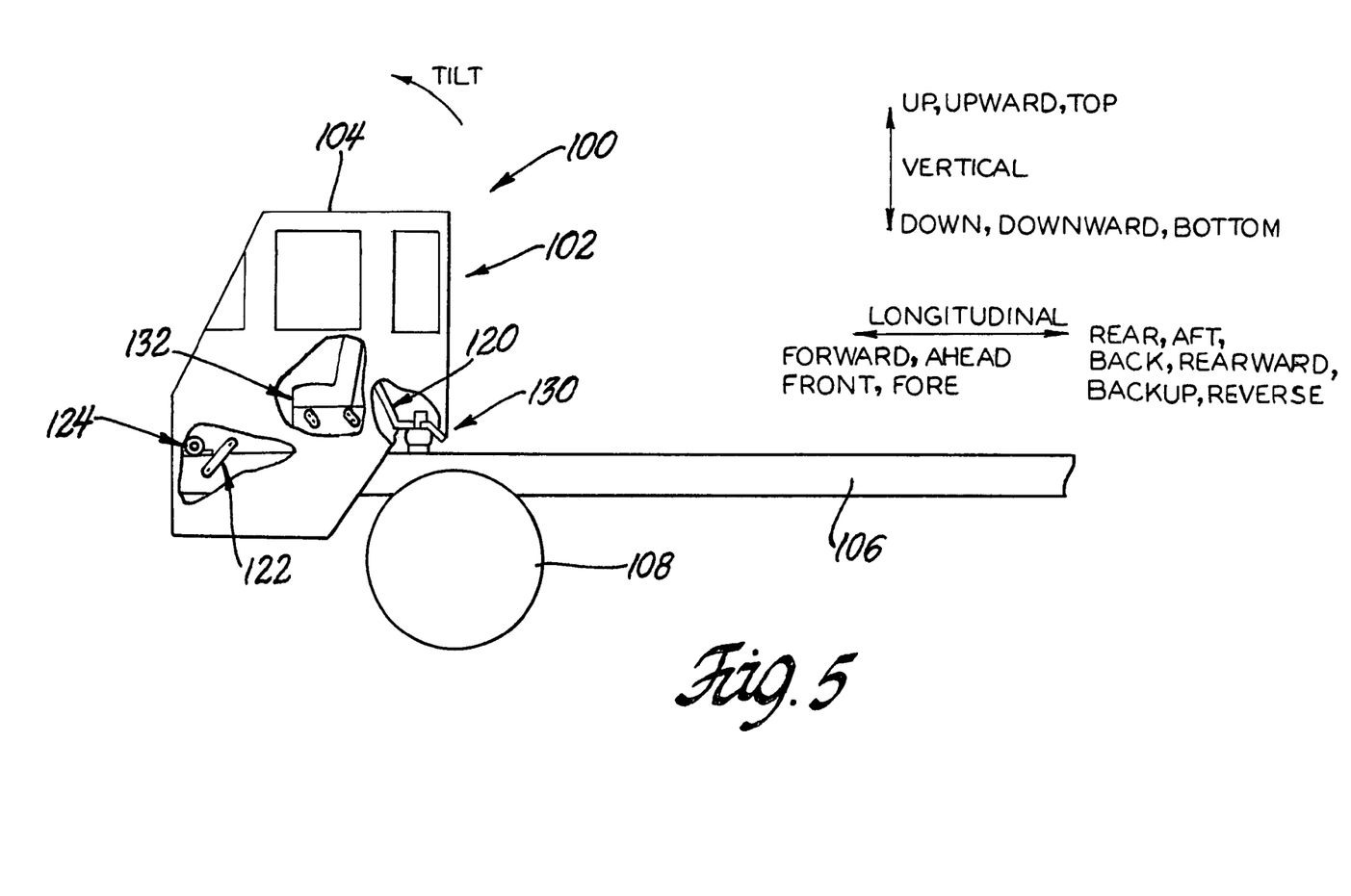
FIG. 5 is a diagram of a vehicle cab occupant landmine protection system of the present invention.

Referring to FIG. 5, a partially cut-away side view diagram illustrating an example of a vehicle cab occupant landmine protection system 100 of the present invention is shown. The vehicle system 100 generally comprises a vehicle (e.g., truck, cab and frame assembly, etc.) 102 that includes a cab 104 mounted on a frame 106. A plurality of wheels 108 (one shown) generally suspend and propel the vehicle 102 over terrain (i.e., ground, earth, etc.) where generally operated. The vehicle 102 may also include underbody armor (not shown). The system 100 generally provides landmine protection for occupants of the vehicle cab 104 via controlled articulation of the cab 104 in response to an under-vehicle explosive event or blast (e.g., explosive force 110, illustrated in connection with FIG. 6).

The system 100 generally further comprises a cab rear control apparatus (e.g., device, assembly, sub-system, etc.) 120, a cab front control apparatus 122, a front hinge mount (and respective resilient bushing) 124, a cab isolation assembly 130, and a seat isolation assembly 132. Elements 120, 122, 124, 130 and 130 are shown for the left side of the vehicle 102 and are generally duplicated on the right side of the vehicle 102 (i.e., the present invention generally has left-to-right lateral symmetry). However, for clarity, the right side elements are not shown.

Relative directions (e.g., vertical, longitudinal, etc.) are generally as shown. Lateral (i.e., transverse, left-right, etc.) directions are generally perpendicular to the vertical-longitudinal plane. The front hinge mount 124 generally provides a lateral, front axis for tilt of the cab 104 for inspection and maintenance operations that may be performed on the vehicle 102.

Controlled articulation and motion of the cab 104 is generally performed using the cab rear control apparatus 120 and the cab front control apparatus 122. The front hinge mount 124, the cab isolation assembly 130, and the seat isolation assembly 132 may provide additional for landmine protection for occupants of the vehicle cab 104.

Figure 6:
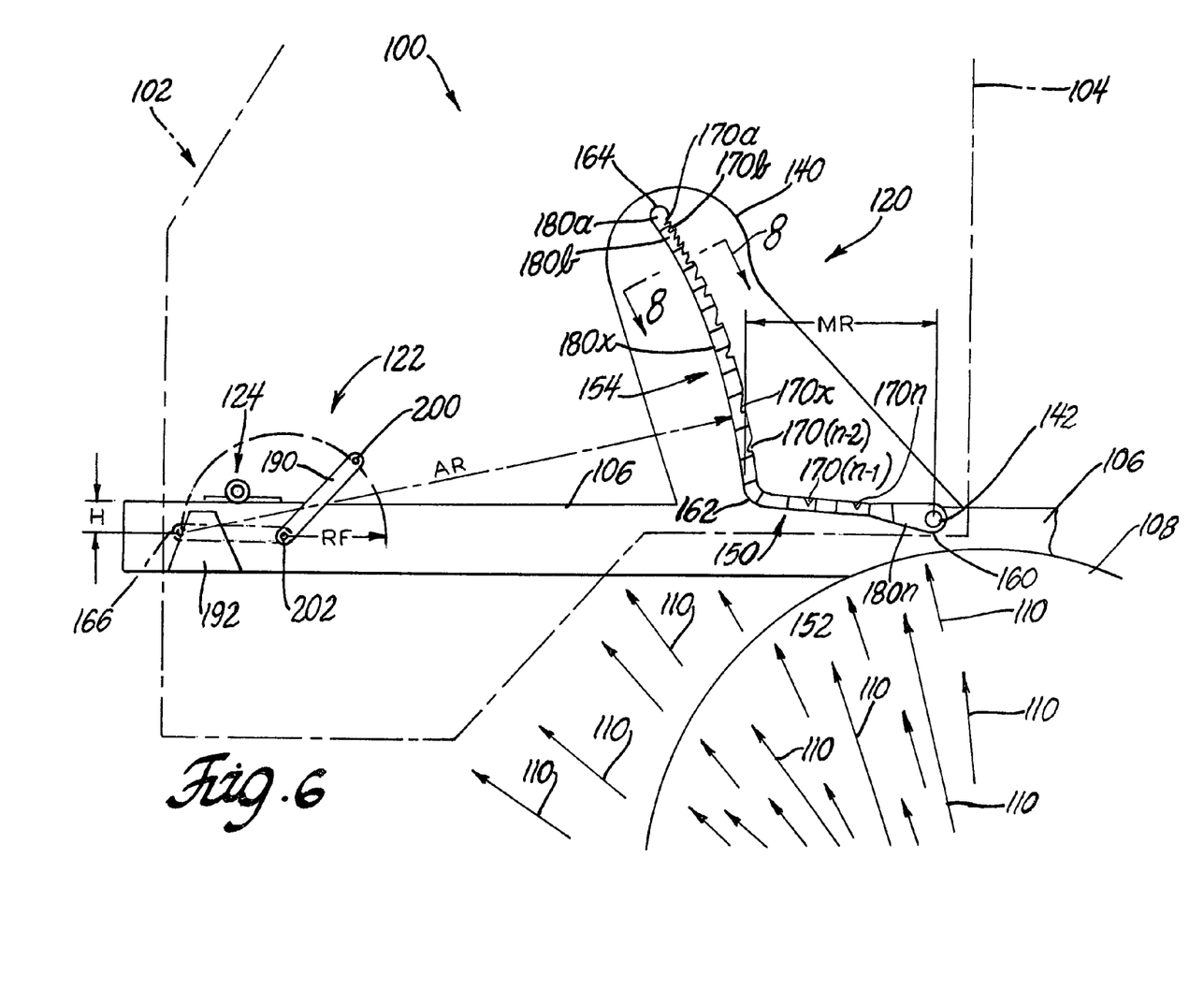
FIG. 6 is a detailed diagram of the vehicle cab occupant landmine protection system of FIG. 5 prior to exposure to an explosive event.

Referring to FIG. 6, a partial side view illustrating additional details of the vehicle cab occupant landmine protection system 100 of the present invention is shown.

The front hinge mount 124 generally fails (e.g., fractures, disintegrates, breaks, etc.) during exposure of the vehicle 102 to an under-vehicle explosive event or other similar catastrophic event. The front hinge mount 124 failure may be a failure of any one or more of the bushing, the pin and the bracket that comprise the mount 124. Such a failure may provide some dissipation of the explosive forces that are generated by the under-vehicle explosive event 110. However, remaining (generally the majority of) explosive forces 110 that are generated by the under-vehicle explosive event may still be of a magnitude (i.e., level, amount, value, etc.) such that injury and fatality to occupants (not shown) of the cab 104 may result. As such, additional force reduction is generally desirable and may be provided by the present invention.

In one example, the vehicle 102 may comprise the cab rear control apparatus 120 and the cab front control apparatus 122. In another example (not shown), the cab front control apparatus 122 may be omitted from the vehicle 102.

In one example, the rear control apparatus 120 generally comprises a structural frame (e.g., sub-assembly, and the like) 140 that is generally sized to fit internal to the cab 104 (shown in phantom). The sub-assembly 140 generally mechanically co-operates with a cab guide pin 142. The sub-assembly 140 is generally mechanically integrated with or mechanically coupled (i.e., bolted, riveted, welded, etc.) to the frame 106 at or near the rear of the cab.

The sub-assembly 140 may have a rear edge that is disposed at an angle of about 45 degrees to the frame 106 in the forward direction. As such the rear edge of the sub-assembly 150 may provide lift to the cab 104 when a catastrophic event 110 is encountered.

The guide pin 142 may be transversely mounted in the cab 104. The cab guide pin 142 may be disposed in a sub-assembly slot 150 in the structural frame 140. When an explosive event 110 is encountered, the cab guide pin 142 generally moves through the slot 150 as the cab 104 moves forward, and lifts upward predominantly at the rear to rotate transversely.

The sub-assembly slot 150 may be somewhat "L" shaped. The slot 150 generally has a substantially straight (i.e., linear), longitudinally positioned (i.e., bottom of the L) section 152 having a first end 160 and a second end 162. The sub-assembly slot 150 generally further includes an arcuate section 154 forming the predominantly vertical leg of the L having a first end 164 and intersecting the longitudinal section 152 at the end 162. The arcuate section 154 generally extends substantially vertically between the end 162 and the end 164.

The distance between the end 162 and the end 164 (i.e., the length of the arcuate section 154) may be nominally about twice the distance between the end 160 and the end 162 (i.e., about twice the length of the straight section 152, MR). The length of the arcuate section 154 may be in a range from about half to five times the length of the section 152. The length of the section 154 may have a preferred range from about the length to three times the length of the straight section 152. However, the relative length the section 154 to the section 152 may be selected to provide a predetermined articulation of the cab 104 in response to the level of explosive force 110 that is generally encountered by the vehicle 102. The predetermined forward then upward articulation of the cab 104 may minimize injury to occupants of the cab 104.

The radius of the arcuate section 154 (e.g., AR) is generally aligned with the respective lateral-longitudinal plane of the frame 106. The arcuate section 154 may have a radius, AR, nominally about twice the distance between the end 162 and the end 164 (i.e., about twice the length of the slot arcuate section 154). The radius of the arcuate section 154, AR, may be in a range from about half to five times the length of the section 154. The radius of the arcuate section 154, AR, may have a preferred range from about the length to three times the length of the arcuate section 154. However, the radius of the arcuate section 154, AR, may be selected to provide a predetermined articulation of the cab 104 in response to the level of explosive force 110 that is generally encountered by the vehicle 102 such that the cab 104 move through a path defined by the arcuate section 154 with minimal or no binding.

The center of the radius of the arcuate section 154 (i.e., a radius center 166) may be positioned vertically about the center of the height of the frame 106 (e.g., at a distance, H, downward from the top of the frame 106 that is about one-half the total height of the frame 106). However, the radius center 166 is generally positioned to provide a predetermined articulation of the cab 104 to meet the design criteria of a particular application in response to the level of explosive force 110 that is generally encountered by the vehicle 102 as described in more detail below.

The guide pin 142 is generally initially positioned at the end 162 (i.e., toward the rear of the vehicle 102). During a normal operation of the system 100, the guide pin 142 generally moves through the sub-assembly slot 150 along a path that may extend from the end 160 to the end 162 and to the end 164, depending on the level of the force that is encountered by the system 100, to define a portion of the articulation of the cab 104. The rear of the cab 104 generally translates forward and then upward during normal operation of the system 100.

In one example, at least one inner edge of the sub-assembly slot 150 may comprise a plurality of teeth 170 (e.g., teeth 170a-170n). The teeth 170 generally deform, bend, or shear during movement of the pin 142 through the slot 150 from the end 160 to the end 164 during normal operation of the system 100. The teeth 170 are generally sized having a spacing, height and shape that is selected to provide increasing resistance to movement of the pin 142 through the slot 150 from the end 160 to the end 164 during normal operation of the system 100. In particular, the teeth 170 are generally more closely spaced towards the end 164 than towards the end 160 to reduce or prevent an abrupt stop at the end 194 when the blast 110 has an extreme amount of energy. In one example, the slot 150 may be filled with a plurality of blocks 180 (e.g., blocks 180a-180n). The blocks 180 (described in more detail in connection with FIG. 8) are generally made of a resilient material (e.g., rubber, elastomer, urethane, and the like). The blocks 180 are generally pushed out from the sub-assembly slot 150 by the pin 142 to provide increasing resistance to movement of the pin 142 through the slot 150 from the end 160 to the end 164 during normal operation of the system 100. The particular material properties of the blocks 180 (e.g., durometer, shear strength, compressive modulus, etc.) are generally selected to meet the design criteria of a particular application.

The front control apparatus 122 generally comprises a rotational control lever arm 190 and a bumper (or stop) 192. The arm 190 rotates on a first pin 200 at a first end, and rotates on a second pin 202 at a second end that is opposite the first end. The pin 200 is generally mounted laterally in the cab 104, and the pin 202 is generally mounted laterally in the frame 106.

The arm 190 may have a length between the location of the first pin 200 and the second pin 202 (e.g., length RF) that is nominally about one-half the length between the points 160 and 162, MR (i.e., the length of the straight section 152). The arm 190 may have a length, RF, that is in a range of one-eighth to three times the length, MR, and that may be preferably in a range of one-fourth to one-and-one-half times the length, MR. The arm 190 is generally disposed rearward in the vehicle 102 at a nominal angle of about 45 degrees relative to the frame 106 prior to the encounter with the explosive force 110. The arm 190 may be disposed rearward in the vehicle 102 in a range of 15 degrees to 90 degrees and preferably in a range of 30 degrees to 60 degrees relative to the frame 106.

The bumper 192 is generally made from a resilient material. The bumper 192 is generally mounted (e.g., on the frame 106) forward of the arm 190, and the bumper 192 generally intercepts the arm 190. The arm 190 may rotate (with the accompanying lift of the cab 104) and the intersection of the arm 190 to the bumper 192 may provide deformation (e.g., compression) of the bumper 192 to provide mitigation of the explosive force upon the occupants of the cab 104 when the vehicle 102 is exposed to an under-vehicle explosive event 110.

In another example (not shown), the sub-system 140 may be used to hold the guide pin 142, the sub-assembly slot 150 may be implemented in the cab 104, and the relative positions and shapes of the sections 152 and 154 may be reversed (with the guide pin 142 toward the front of the vehicle 102). Such an example will generally perform substantially the same as the system 100, and may, in some particular applications, be more economical and practicable to implement.

Figure 7:
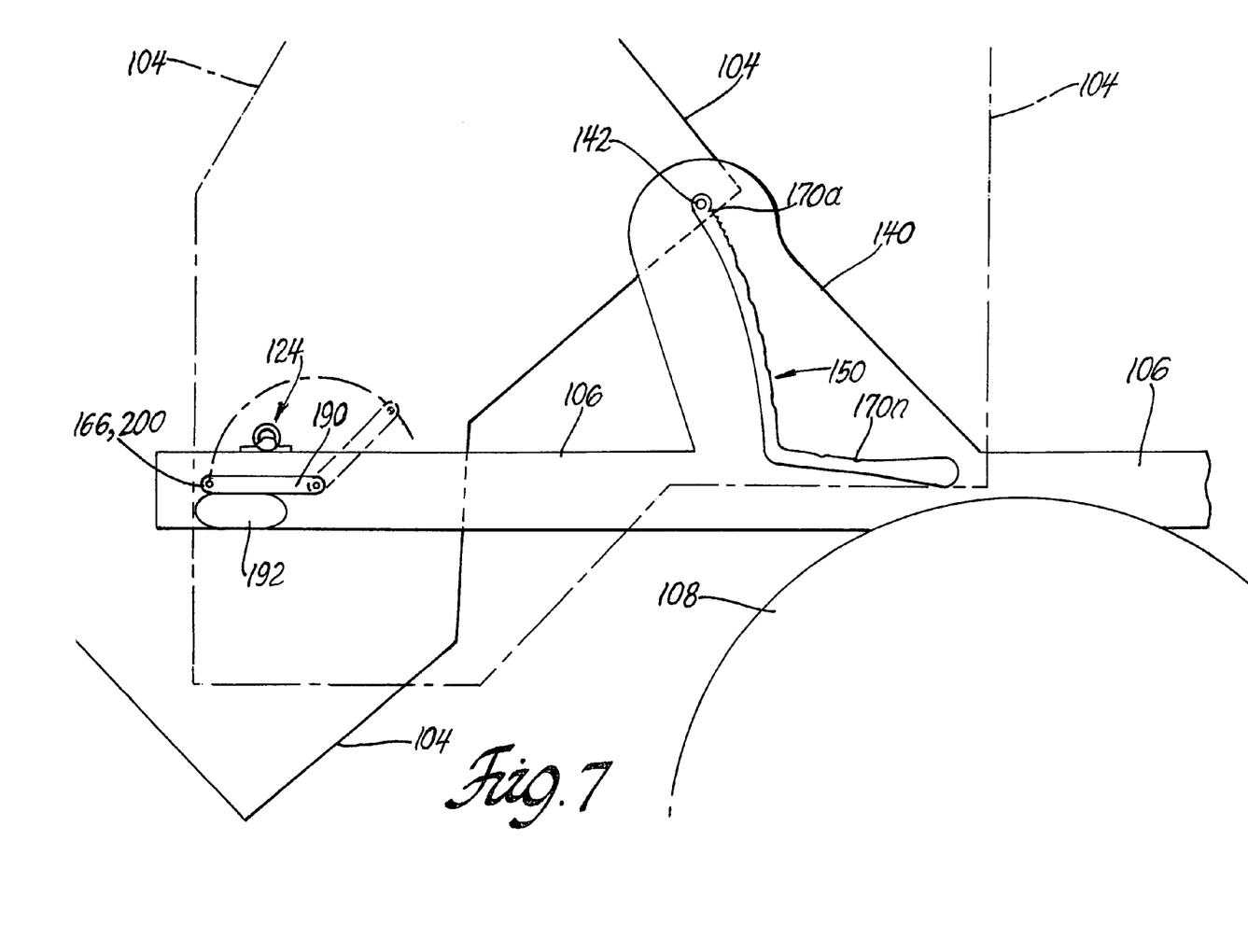
FIG. 7 is a simplified diagram of the vehicle cab occupant landmine protection system of FIG. 5 before and after exposure to an explosive event.

Referring to FIG. 7, a diagram illustrating the operation of the present invention in response to a blast (i.e., the explosive event 110) is shown. For reference, the position of the cab 104 and the arm 190 before the blast 110 is shown in phantom. For clarity, the left portion of the panel in the region of elements 124, 190 and 192 after the blast event 110 is shown as solid lines rather than dashed lines.

In response to the event 110, the guide pin 142 generally slides forward in the slot region 152. The cab 104 may also rotate generally upward and forward as the guide pin 142 travels through the slot region 154. The teeth 170 are generally deformed and the blocks 180 are generally displaced from the slot 150. The front hinge mount 124 generally fails and the arm 190 generally rotates such that the bumper 192 is compressed.

The resting position of the control arm 190 after the vehicle 102 has encountered a catastrophic event 110 may be such that the pin 200 is generally at or near the radius center 166. The arm 190 may be substantially horizontal with the pin 200 in a forward orientation. As such, the arm 190 generally rotates forward with minimal or no binding in the system 100.

Figure 8:
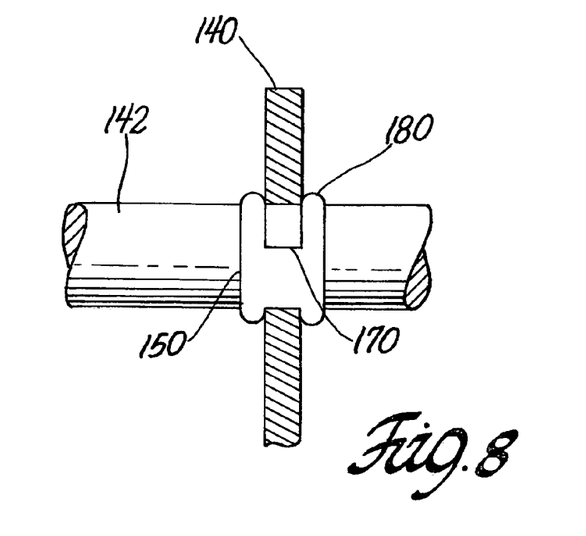
FIG. 8 is a cross-sectional view of an example of a portion of an isolation apparatus of the present invention.

Referring to FIG. 8, a sectional view taken at line 8-8 of FIG. 6 is shown.

Figure 9:
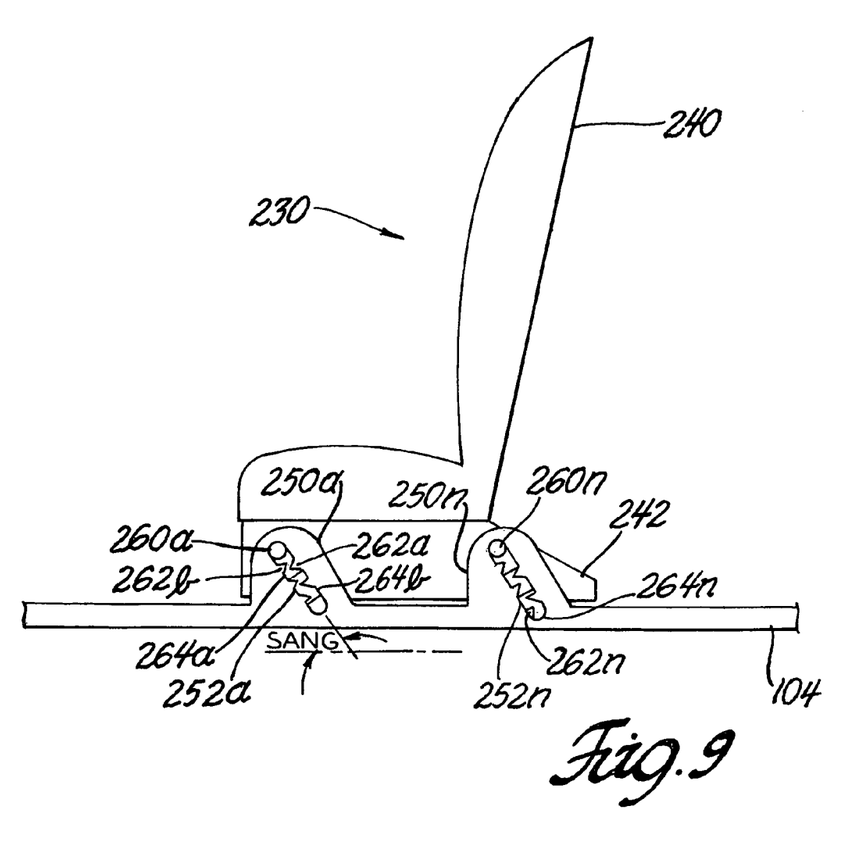
FIG. 9 is a side view of a seat protection system of the present invention.

Referring to FIG. 9, a side view illustrating of a portion of the interior of the cab 104 is shown. A seat assembly 230 is generally implemented within the cab 104 to provide seating for occupants (not shown). The seat assembly 230 may provide shock and vibration protection for occupants of the vehicle cab 104 in response to an under-vehicle explosive event 110.

The seat assembly 230 generally comprises a seat 240 mounted to a seat base 242. The seat base 242 may be mounted to the floor of the cab 104 via seat sub-frames 250 (e.g., seat sub-frames 250a-250n). The sub-frames 250 may have respective seat sub-frame slots 252 (e.g., slots 252a-252n) that are substantially linear and are at an angle (e.g., SANG) with respect to the floor of the cab 104. The angle, SANG, is generally disposed forward in the vehicle 102 at a nominal angle of about 45 degrees relative to the floor of the cab 104 prior to the encounter with the explosive force 110. The angle, SANG, may be disposed forward in the vehicle 102 in a range of 15 degrees to 90 degrees and preferably in a range of 30 degrees to 60 degrees relative to the floor of the cab 104.

Respective seat guide pins 260 (e.g., seat guide pins 260a-260n) are generally attached to the seat base 242, and are laterally positioned through the top of the respective seat sub-frame slot 252. In one example, at least one inner edge of the slot 252 may comprise a plurality of seat sub-frame teeth 262 (e.g., teeth 262a-262n). The respective teeth 262 generally deform, bend, or shear during movement of the respective pin 260 through the slot 252 from the top end to the bottom end during normal operation of the system 100. The seat sub-frame teeth 262 are generally sized and positioned having spacing, height and shape that are selected to provide increasing resistance to movement of the seat guide pin 260 through the seat sub-frame slot 252 during normal operation of the system 100 in response to an explosive event 110.

In one example, the seat sub-frame slot 252 may be filled with a plurality of seat sub-frame blocks 264 (e.g., blocks 264a-264n). The blocks 264 are generally made of a resilient material (e.g., rubber, elastomer, urethane, and the like). The seat sub-frame blocks 264 are generally pushed out from the slot 252 by the pin 260 to provide increasing resistance to movement of the pin 260 through the seat sub-frame slot 252 during normal operation of the system 100. The particular size, shape, and material properties of the seat sub-frame blocks 264 (e.g., durometer, shear strength, compressive modulus, etc.) are generally selected to meet the design criteria of a particular application.

Figure 10:
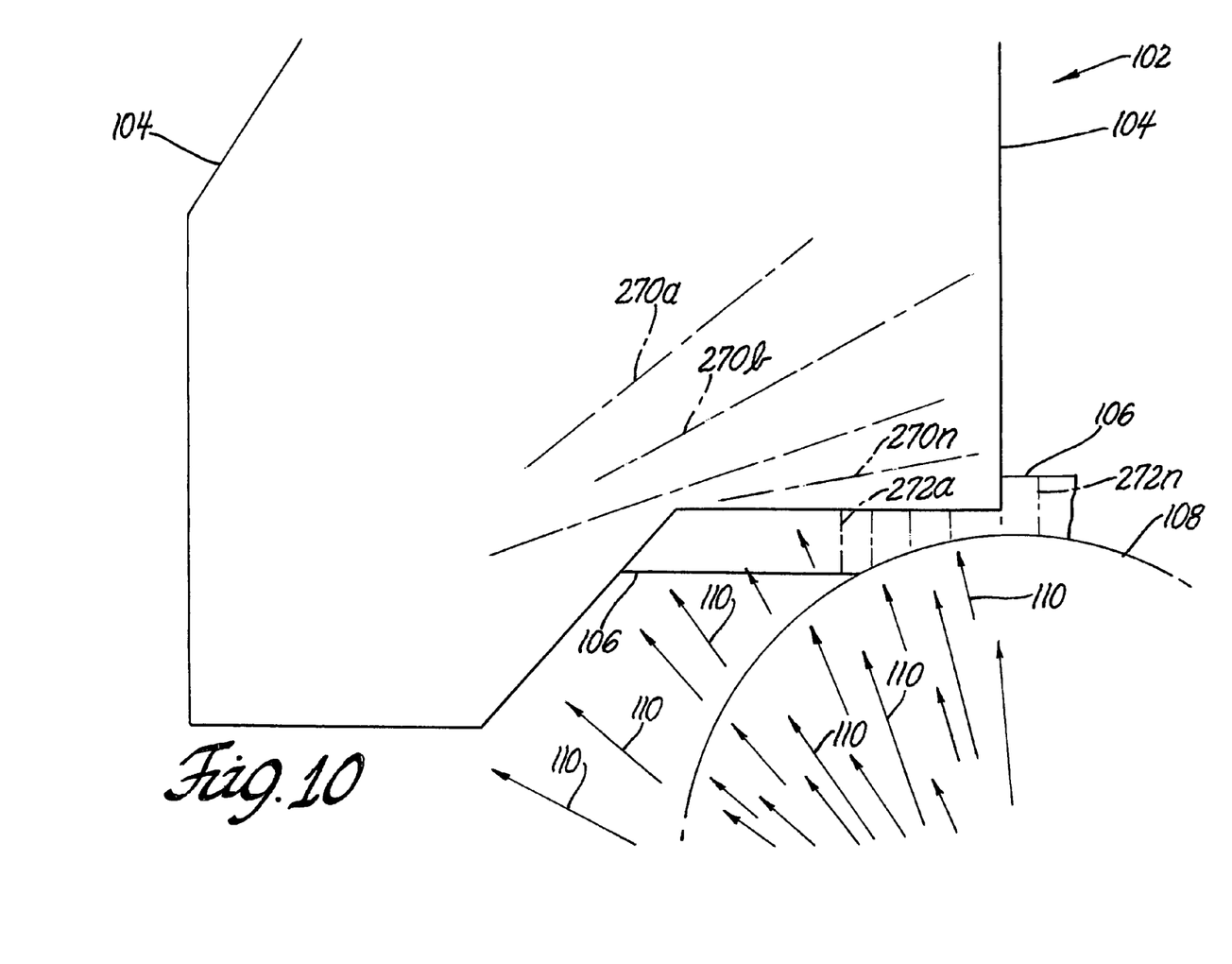
FIG. 10 is a diagram of a vehicle cab of the present invention prior to exposure to an explosive event.

Referring to FIG. 10, a diagram illustrating a side view of another example of the vehicle 102 of the present invention prior to exposure to an explosive event is shown. The cab 104 may include at least one crease (e.g., fold, pleat, wrinkle, deformation, convolution, etc.) 270 (e.g., creases 270a-270n) shown in phantom. The cab 104 having the creases 270 may provide a structure that controllably collapses (i.e., folds, deforms, bends, etc.) in response to an explosive event 110. Such a controlled collapse of the cab 104 may provide landmine protection (e.g., reduction or elimination of shock and vibration) for occupants of the vehicle cab 104. The particular number of, size, shape, and material properties of the creases 270 are generally selected to meet the design criteria of a particular application.

Similarly, the frame 106 may comprise at least one crease 272 (e.g., creases 272a-272n) shown in phantom. The frame 106 having the creases 272 may provide a structure that controllably collapses in response to an explosive event 110. Such a controlled collapse of the frame 106 may provide landmine protection (e.g., reduction or elimination of shock and vibration) for occupants of the vehicle cab 104. The particular number of, size, shape, and material properties of the creases 272 are generally selected to meet the design criteria of a particular application.

Figure 11:
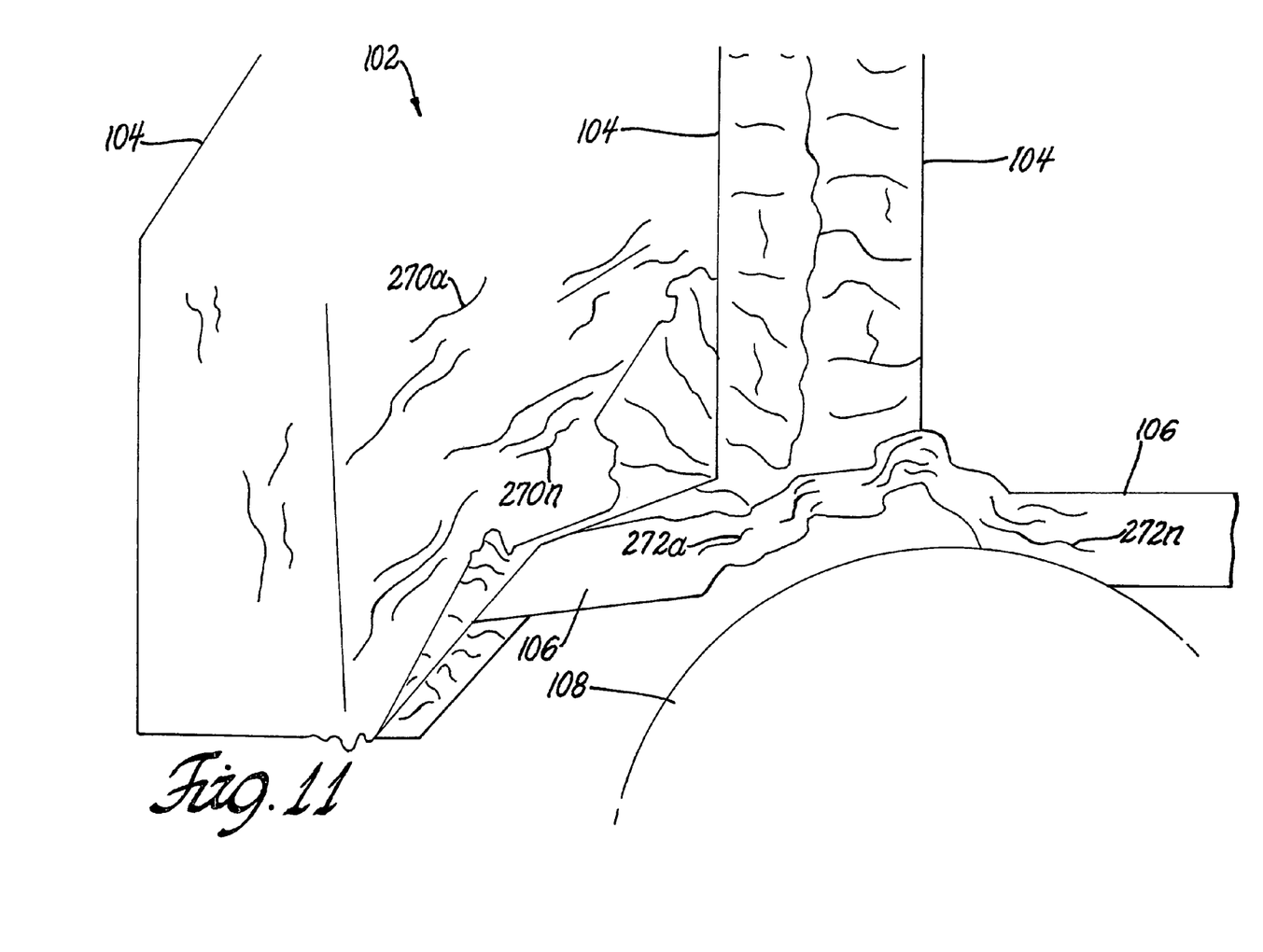
FIG. 11 is a diagram of the vehicle cab of FIG. 10 after exposure to an explosive event.

Referring to FIG. 11 a diagram of the vehicle 102 of FIG. 10 after exposure to an explosive event 110 is shown. Crumpled creases 270 and 272 are shown as solid lines.

As is apparent then from the above detailed description, the present invention may provide an improved system and an improved method for a vehicle, and in particular, a vehicle cab with landmine protection for occupants of the vehicle cab.

Various alterations and modifications will become apparent to those skilled in the art without departing from the scope and spirit of this invention and it is understood this invention is limited only by the following claims.

What is claimed is:

1. A system for providing a vehicle with landmine protection for occupants of a vehicle cab via controlled articulation of the vehicle cab in response to an under-vehicle explosive event, the system comprising:
   a cab guide pin attached to the rear of the vehicle cab; and
   a vehicle frame having a sub-frame, wherein:
   the vehicle cab is mounted on the vehicle frame,
   the sub-frame includes a sub-assembly slot and the cab guide pin is disposed laterally at a first end in the sub-assembly slot,
   the sub-assembly slot has a substantially straight first section that is longitudinally positioned and includes the first end of the sub-assembly slot, and a second arcuate section that extends vertically and forward from the first section opposite of the first end of the sub-assembly slot, and
   when the vehicle is exposed to an under-vehicle explosive event, the vehicle cab articulates such that the cab guide pin travels forward through the first substantially straight section of the sub-assembly slot and in an arcuate path through the second arcuate section of the sub-assembly slot.

2. The system of claim 1 wherein the length of the arcuate section is nominally about twice the length of the straight section, in a range from about half to five times the length of the straight section, and has a preferred range from about the length to three times the length of the straight section.

3. The system of claim 2 wherein the arcuate section has a radius nominally about twice the length of the arcuate section, in a range from about half to five times the length of the arcuate section, and a preferred range from about the length to three times the length of the arcuate section.

4. The system of claim 3 wherein the radius of the arcuate section has a center positioned vertically about the center of the height of the vehicle frame.

5. The system of claim 4 wherein the sub-assembly slot further comprises a plurality of teeth on the inside of the sub-assembly slot, the teeth having a spacing, height and shape that are selected to provide increasing resistance to movement of the cab guide pin.

6. The system of claim 5 wherein the sub-assembly slot is filled with a plurality of blocks made of a resilient material, and the blocks are pushed out of the slot to provide increasing resistance to movement of the cab guide pin.

7. The system of claim 6 further comprising:
   a control lever arm mounted at the front of the vehicle cab between the vehicle cab and the vehicle frame; and a resilient bumper mounted to the vehicle frame, wherein:

the control lever arm is disposed rearward in the vehicle, and the control arm rotates forward and intersects the bumper with an accompanying lift of the cab when the vehicle is exposed to an under-vehicle explosive event.

8. The system of claim 7 wherein the control lever arm has a length that is nominally about one-half the length of the straight section of the sub-assembly slot, in a range of one-eighth to three times the length of the straight section of the sub-assembly slot, and preferably in a range of one-fourth to one-and-one-half times the length of the straight section of the sub-assembly slot.

9. The system of claim 7 wherein the control lever arm is disposed rearward in the vehicle at a nominal angle of about 45 degrees relative to the vehicle frame, in a range of 15 degrees to 90 degrees, and preferably in a range of 30 degrees to 60 degrees.

10. The system of claim 1 further comprising a seat assembly to provide additional shock and vibration protection for occupants of the vehicle cab in response to the under-vehicle explosive event, wherein the seat assembly comprises:

a seat mounted to a seat base;

the seat base is mounted to the floor of the vehicle cab via seat sub-frames;

the seat sub-frames have respective seat sub-frame slots that are substantially linear and are at an angle disposed forward in the vehicle at nominally about 45 degrees relative to the floor of the vehicle cab, in a range of 15 degrees to 90 degrees, and preferably in a range of 30 degrees to 60 degrees; and respective seat guide pins that are attached to the seat base, and are laterally positioned through the top of the respective seat sub-frame slots;

at least one inner edge of the seat sub-frame slots comprises a plurality of seat sub-frame teeth that deform, bend, or shear during movement of the respective seat guide pin through the seat sub-frame slot from the top end to the bottom end; and the seat sub-frame slots are filled with a plurality of seat sub-frame blocks made of a resilient material, and the seat sub-frame blocks are pushed out from the seat sub-frame slot by the seat guide pin to provide increasing resistance to movement of the seat guide pin through the seat sub-frame slot when the vehicle is exposed to the under-vehicle explosive event.

11. The system of claim 1 further comprising creases in the vehicle cab and in the vehicle frame, wherein the creases are of a number size, shape, and having material properties to provide a controlled collapse of the vehicle cab and the frame when the vehicle is exposed to the under-vehicle explosive event.

12. A method of providing landmine protection to occupants of a vehicle via controlled articulation of a vehicle cab in response to an under-vehicle explosive event, the method comprising:

attaching a cab guide pin to the rear of the vehicle cab; and mounting the vehicle cab on a vehicle frame, the vehicle frame having a sub-frame, wherein:

the sub-frame includes a sub-assembly slot and the cab guide pin is disposed laterally at a first end in the sub-assembly slot, the sub-assembly slot has a substantially straight first section that is longitudinally positioned and includes the first end of the sub-assembly slot, and a second arcuate section that extends vertically and forward from the first section opposite of the first end of the sub-assembly slot, and when the vehicle is exposed to an under-vehicle explosive event, the vehicle cab articulates such that the cab guide pin travels forward through the first substantially straight section of the sub-assembly slot and in an arcuate path through the second arcuate section of the sub-assembly slot.

13. The method of claim 12 wherein the length of the arcuate section is nominally about twice the length of the straight section of the sub-assembly slot, in a range from about half to five times the length of the straight section of the sub-assembly slot, and has a preferred range from about the length to three times the length of the straight section of the sub-assembly slot.

14. The method of claim 13 wherein the arcuate section has a radius nominally about twice the length of the arcuate section, in a range from about half to five times the length of the arcuate section, and a preferred range from about the length to three times the length of the arcuate section.

15. The method of claim 14 wherein the radius of the arcuate section has a center positioned vertically about the center of the height of the vehicle frame.

16. The method of claim 15 wherein the sub-assembly slot further comprises a plurality of teeth on the inside of the sub-assembly slot, the teeth having a spacing, height and shape that are selected to provide increasing resistance to movement of the cab guide pin.

17. The method of claim 16 wherein the slot is filled with a plurality of blocks made of a resilient material, and the blocks are pushed out of the sub-assembly slot to provide increasing resistance to movement of the cab guide pin.

18. The method of claim 17 further comprising:

mounting a control lever arm at the front of the vehicle cab between the vehicle cab and the vehicle frame; and mounting a resilient bumper to the vehicle frame, wherein:

the control lever arm is disposed rearward in the vehicle, and the control arm rotates forward and intersects the bumper with an accompanying lift of the cab when the vehicle is exposed to an under-vehicle explosive event.

19. The method of claim 18 wherein the control lever arm has a length that is nominally about one-half the length of the straight section of the sub-assembly slot, in a range of one-eighth to three times the length of the straight section of the sub-assembly slot, and preferably in a range of one-fourth to one-and-one-half times the length of the straight section of the sub-assembly slot.

20. The method of claim 19 wherein the control lever arm is disposed rearward in the vehicle at a nominal angle of about 45 degrees relative to the vehicle frame, in a range of 15 degrees to 90 degrees, and preferably in a range of 30 degrees to 60 degrees.

* * * * *